Nov. 7, 1939.  W. S. HEATH  2,178,789
ANIMAL TRAP
Filed Jan. 12, 1937
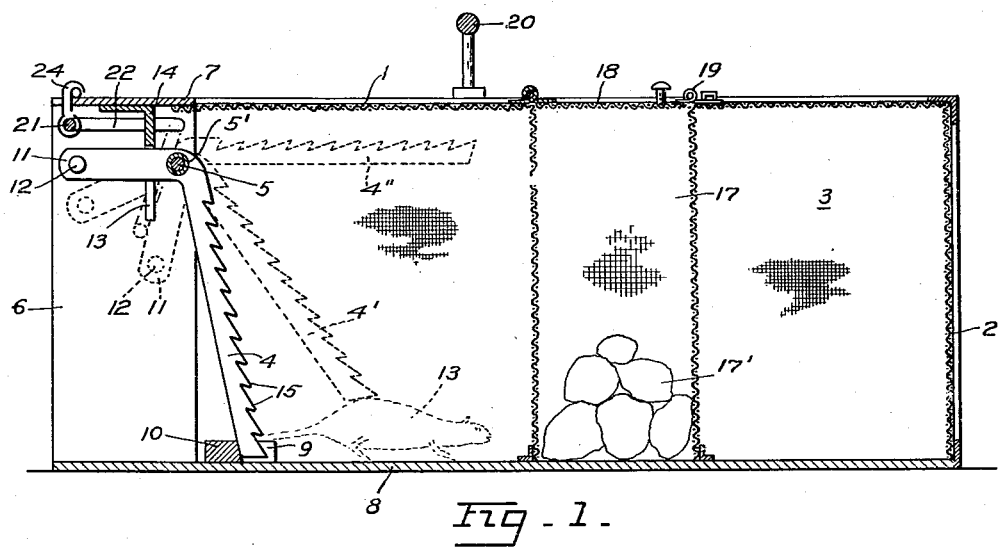
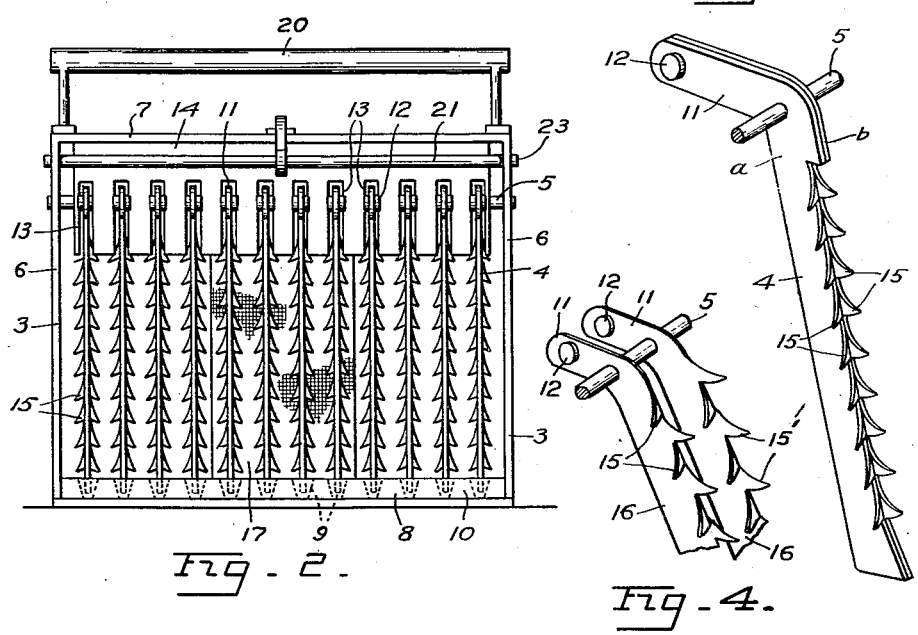
INVENTOR.
WALTER S. HEATH
BY
Miller Boyken &Bird
ATTORNEY.

Patented Nov. 7, 1939

2,178,789

UNITED STATES PATENT OFFICE 2,178,789

ANIMAL TRAP

Walter S. Heath, Bakersfield, Calif.

Application January 12, 1937, Serial No. 120,262

3 Claims. (Cl. 43—66)

This invention relates to animal traps and has for its objects a device adapted to entrap one or more animals, without injury to the animals, and improved means for facilitating the entry of animals into the trap while preventing exit of animals therefrom. Other objects are a trap of the above character that is simple and cheap to manufacture, easy to clean, economical to use, and is constructed in a manner to provide for quick and easy disposal of entrapped animals and is more efficient for luring animals to the trap and entrapping the animals than heretofore, without re-baiting of the trap and without re-setting of the trap after one or several animals are entrapped within the same.

Other objects and advantages will appear in the specification and drawing annexed hereto.

In the drawing, Fig. 1 is a vertical sectional view of the trap taken longitudinally thereof.

Fig. 2 is an end view of the trap as seen from the entrance end thereof.

Fig. 3 is a perspective view of one of the elements of the trap, the shaft mounting, the same being broken away and in section.

Fig. 4 is a fragmentary, perspective view of a modified form of the element shown in Fig. 3.

In detail, the device illustrated in the drawing, comprises a cage having a top 1, end 2, and two opposed sides 3, of wire screening of a gage and mesh of suitable size to prevent an animal within the cage from escaping. The end of the cage opposite end 2 is normally closed by a grill in the form of a horizontal row of spaced, vertically extending bars 4, which bars are mounted adjacent their upper ends on a horizontal rod 5 for pivoting thereon, each of the bars being adapted to pivot independently of the other bars. Rod 5 is fixed at its opposite ends in vertical side plates 6, which plates are extended from sides 3 of the cage to which they connect, and a top plate 7 connects between the upper edges of plates 6, the top plate being substantially extended from the top with which it connects. The plates 6 connect at their lower ends to bottom 8 of the cage, which bottom also connects with the lower edges of sides 3 and end 2.

When the trap is in position for trapping animals, the bars 4 are slightly inclined inwardly into the cage from their upper ends toward their lower ends with their lower ends received in outwardly opening recesses or notches 9 formed in a sill 10 on the bottom 8 which sill extends across the bottom between sides 3, the lower ends of the bars engaging the sill at the closed ends of the recesses. Thus an animal within the cage cannot spring the bars apart at their lower ends in an effort to escape from the cage.

At their upper ends, the bars 4 are formed with generally horizontal extensions 11, which extensions project from the bars in a direction outwardly of the end of the cage adjacent thereto, the bars and extensions thus forming generally L-shaped elements with the rod 5 extending through the elements at the juncture of the bars and extensions 11. Each of the extensions is provided with a weight 12 positioned therealong outwardly of the rod 5 to substantially counterweight the bar 4 as the bars engaged by an animal 13 (indicated in dotted line) will swing upwardly to position 4' (dotted line) upon the slightest force being exerted by the animal against the sides of the bars facing outwardly of the cage, and as the animal passes below and between the bars, they will silently and gently fall to the original closed position, behind the animal. This counterbalancing of the bars 4 is very important for the reason that there is no noticeable pressure of the bars against the back or sides of the animal to arouse its suspicions, whereas, where there is a noticeable increase in weight, as would normally occur were the arms not counterweighted, the animal generally becomes suspicious and attempts to back out or to turn. Also the gentle and silent falling of the bars to closed position does not arouse the suspicion of other animals that may be desirous of following the first animal into the cage. I have further found that the provision of a sill, such as sill 10, over which the animal must pass, facilitates the entrance of the animal, in that the swinging of the bars occurs as the animal exerts an extra force in elevating itself over the sill and the slight pressure of the bars on the animal which occurs practically simultaneously with this extra exertion, passes unnoticed by the animal.

The extensions 11 swing downwardly in an arc in vertical slots 13 formed in a plate 14 that depends from top plate 7, this construction tending to space the bars 4, and I also may provide spacers 5' on rod 5 between the bars, to more accurately space the bars while allowing sufficient play to prevent any material frictional resistance to swinging of the bars. In some instances I may eliminate the plate 14 if desired. Also the recesses 9 in sill 10 may be formed with beveled sides as best seen in Fig. 2, to insure the proper entry of the lower ends of the bars into the recesses in the event of any slight shifting of the bars on the rod 5.

Describing the bars 4 more in detail, each of said bars may be formed of a pair of elongated strips a, b, of flat sheet metal to inverted L-shaped form secured together in any suitable manner, as by soldering or riveting, (see Fig. 3). The adjacent edges of the strips forming the bar 4 that face into the cage are formed with relatively large downwardly inclined teeth 15, the teeth on the strips being correspondingly positioned along the edges of the respective strips of each pair, but turned outwardly of each other at about 45 degrees from the plane of the strips. In Fig. 2 it will be seen that the teeth of the bars form horizontal rows with the teeth on adjacent strips of adjacent pairs of bars turned toward each other, whereby the space between such teeth is the minimum space between the adjacent bars.

In Fig. 4 each bar 16 is a single strip with the teeth 15' alternately projecting to opposite sides of the plane of the bars respectively, and with the teeth on the adjacent bar of each pair of bars arranged so that the alternate teeth of similar elevation on each of the bars of adjacent pairs of bars project toward each other to define, between the points thereof, the minimum space between adjacent bars.

This construction is important in that the spacing between the main body of the bars may be sufficiently great to permit the head of the animal to pass therebetween and thus encourage the animal to attempt to pass between the bars, the animal not being discouraged nor conscious of the fact that the spacing between the teeth of adjacent pairs of bars is actually much less than the space between the body of the bars. Also the teeth do not materially obstruct the view through the bars into the cage, hence the animal will readily attempt to enter the cage at the end across which the bars extend in preference to attempting to gain access to the cage through any of the sides covered with screening.

When the animal is partially within the cage, say half way, and the bars are lifted, it is obvious that the animal cannot turn around to escape, due to the teeth on the bars at its sides, nor can it back out for the same reason, and the animal will advance to the half-way position since it invariably makes a sudden forward movement to get over the sill 9. Of course, once the animal is within the cage, the teeth on the bars generally preclude any serious attempt to force an exit between the bars.

Within the cage I provide a tubular, vertically extending bait receptacle 17, generally of wire screening of a mesh to prevent the animal from eating the bait 17' therein, which receptacle extends to the bottom of the cage at its lower end and opens at its upper end through top 1. The upper open end of the receptacle is covered by a hinged cover 18 adapted to be locked closed by a hasp 19, and a handle 20 secured to the cage in position over the same may be provided for carrying the cage.

For opening the cage to clear it of animals I provide a horizontal rod 21 in position extending across and above the extensions 11 of bars 4, the rod 21 having similarly offset end portions 22, the end portions being bent oppositely outwardly at their free ends 23, which ends 23 pivotally extend through plates 6. Centrally positioned along rod 21 is a hook 24 adapted to releasably support the rod 21 from top plate 7 with the rod 21 clear of the extensions 11. Upon releasing the hook from engagement with the top, the rod 21 will drop in an arc onto the extensions 11 of the bars 4 causing all the bars to raise to dotted position 4'', indicated in Fig. 1, thus opening the cage for clearing it of animals. Also I may leave the bars 5 in raised position for a day or so in the place where it is desired to leave it for trapping animals, and scatter bait over the floor 8 to encourage animals to freely enter and leave the cage, and then "set" the trap, as it were, by elevating the bar 21 and permitting bars 4 to fall. Thereafter, the bait is again spread, a quantity being inside receptacle 17, and even the most wary animals will enter the cage.

While the trap shown in the drawing is of a suitable construction for catching mice, rats, weasels or the like, I have trapped reptiles, fowl, skunks, coyotes and bear in larger sized traps having similar elements, but of much greater strength, the wire mesh of the cage walls and bait receptacle being replaced with bars, and the bait receptacle of a size to enclose live chickens or a live lamb or sheep.

Where traps are of a size where dogs or cats, or pets may inadvertently be caught therein, it is obvious that the animal thus caught is not injured and may be quickly released by merely dropping rod 21 onto the extensions 11.

While I am aware that there have been cage-type traps using swinging bars on an entrance to within the cage, the features defined in the claims that follow are believed to be new and to overcome the objections heretofore found in the use of somewhat similar appearing traps.

Having described my invention, I claim:

1. An animal trap comprising a cage having sides, a top, and a bottom, one of the sides comprising a horizontal row of spaced substantially L-shaped bars in inverted position with the base of each bar uppermost and substantially horizontal and with the leg substantially vertical but normally inclined slightly inwardly relative to the interior of the cage from its juncture with the base to the lower free end thereof, a horizontal bar pivotally mounting said bars thereon at the juncture of the base and leg of each bar for supporting the bars with the free ends of the legs adjacent the bottom and for swinging the legs inwardly and upwardly into the cage, the base of each bar extending from said rod in a direction outwardly of the cage, the base of each bar being of a weight to substantially counterbalance the weight of the leg thereof for facilitating the inward swinging of the leg while permitting the leg to swing by gravity to its normally inclined position, said bars being adapted to swing independently of each other on said rod, and means for swinging the bars simultaneously to a position with the legs thereof elevated comprising an elongated member releasably supported over the bases of the legs adapted to fall onto the bases when released for causing the bases to swing downwardly and thereby causing the legs to swing inwardly and upwardly into the cage.

2. An animal trap comprising a cage having sides, a top, and a floor, one of said sides being formed to provide an entrance opening to within the cage, a closure for said opening comprising a horizontal row of relatively thin, substantially vertically extending spaced bars, means pivotally mounting said bars adjacent their upper ends for swinging of their lower ends laterally and upwardly independently of each other in a direction inwardly into the cage to permit an animal to pass below said lower ends to within the cage, stop means on the floor engaging said lower ends against swinging thereof in direction outwardly of the cage, substantially horizontally extending extensions on said arms at their upper ends extending from said pivot means in a direction generally outwardly of the cage, counterweights on said extensions for substantially balancing the arms and to facilitate the swinging of the bars on the pivot means, and cover means rigid with said cage extending over said extensions and counterweights protecting the same against accidental manipulation of said extensions and counterweights from above.

3. An animal trap comprising a cage having sides, a top, and a floor, one of said sides being formed to provide an entrance opening to within the cage, means substantially closing said entrance opening to exit of animals from the cage while admitting entrance of animals to within the cage, said means comprising a horizontal row of spaced, generally vertically extending bars, means pivotally mounting said bars adjacent their upper ends for swinging the bars inwardly and upwardly into the cage, a vertical row of pairs of barbs projecting from the side of each bar that faces inwardly into the cage, the barbs of each pair extending generally divergently from the bar to their pointed ends whereby the pointed ends of the barbs on adjacent pairs of bars will engage an animal within the cage attempting to escape between the bars, said bars being relatively thin in the direction in which the row extends for permitting a relatively clear view of the inside of the cage through the entrance opening from the outside of the cage.

WALTER S. HEATH.